United States Patent [19]

Toyokura et al.

[11] Patent Number: 5,774,764
[45] Date of Patent: Jun. 30, 1998

[54] IMAGE RECORDING APPARATUS AND OPTION CONTROL APPARATUS

[75] Inventors: Yoichi Toyokura, Kawasaki; Junichi Kimizuka, Yokohama; Shigeru Ueda, Wako; Satoshi Nagata, Tama; Akihiro Nakamura, Mishima; Satoshi Egawa; Shinichiro Maekawa, both of Kawasaki; Yutaka Tokura, Machida, all of Japan

[73] Assignee: Canon Kabushiki Kaisha, Tokyo, Japan

[21] Appl. No.: 693,704

[22] Filed: Aug. 7, 1996

[30] Foreign Application Priority Data

Aug. 8, 1995 [JP] Japan .................................. 7-202462

[51] Int. Cl.⁶ .......................... G03F 15/00; G06F 15/00
[52] U.S. Cl. .......................... 399/77; 364/138; 395/101
[58] Field of Search ............................. 399/75, 77, 107, 399/110; 347/138, 152; 358/296; 364/146, 188, 138; 395/101, 114

[56] References Cited

U.S. PATENT DOCUMENTS

| | | | |
|---|---|---|---|
| 5,086,309 | 2/1992 | Iida et al. | 347/139 |
| 5,126,786 | 6/1992 | Tanaka | 355/46 |
| 5,537,605 | 7/1996 | Teece | 364/146 X |
| 5,600,445 | 2/1997 | Omi | 358/296 |

FOREIGN PATENT DOCUMENTS 2-36971  2/1996  Japan .

*Primary Examiner*—Joan H. Pendegrass
*Attorney, Agent, or Firm*—Fitzpatrick, Cella, Harper & Scinto

[57] ABSTRACT

When an optional unit (40, 50) is mounted, a video controller (27) serving as main control unit sends various control commands to a supervising controller (101) through an interface (114). The supervising controller (101) controls an engine controller (26) through an interface (29) while controlling the optional unit (40, 50) in accordance with the received control commands, thereby recording an image. When no optional unit is mounted (when the optional units 32, 40, 50 are absent), the video controller (27) directly controls the engine controller (26) through an interface (28), thereby recording an image. With the above arrangement, the supervising controller (101) serving as a control unit associated with optional units can be attached/detached.

27 Claims, 7 Drawing Sheets

IMAGE RECORDING APPARATUS AND OPTION CONTROL APPARATUS

BACKGROUND OF THE INVENTION

The present invention relates to an image recording apparatus and an option control apparatus and, more particularly, to an image recording apparatus in which at least one optional unit can be mounted, and an option control apparatus.

Conventionally, an image recording apparatus such as a laser printer using an electrophotography process has an arrangement as shown in FIG. 7. Referring to FIG. 7, an image recording apparatus main body 201 has a video controller 202 and an engine controller 203. The video controller 202 mainly performs control associated with image processing. For example, the video controller 202 develops image information sent from an external unit (not shown) such as a personal computer through a general-purpose interface such as a centronics interface into bit data and controls the engine controller 203 to record an image using the data. The engine controller 203 mainly performs control associated with the electrophotography process including charging, exposure, development, transfer, fixing, and paper conveyance. A video interface 204 connects the video controller 202 to the engine controller 203, thereby enabling mutual communication.

A paper deck option 205 contains recording paper sheets in a large quantity and feeds the recording paper sheets to the image recording apparatus 201 in accordance with an instruction from the engine controller 203. A paper deck interface 206 connects the engine controller 203 to the paper deck option 205, thereby enabling mutual communication.

A sorter option 207 has a plurality of stack trays and, in accordance with an instruction from the engine controller 203, sorts recording paper sheets delivered from the image recording apparatus 201 after the recording operation and stacks them on the trays in accordance with predetermined classifications. A sorter interface 208 connects the engine controller 203 to the sorter option, thereby enabling mutual communication.

In the above arrangement, upon receiving image information and a print instruction from an external unit (not shown), the video controller 202 sends a video signal as bit data obtained by converting the image information and the print instruction to the engine controller 203 through the video interface 204. The video controller 202 also sends instructions associated with the use of the paper deck option 205 and the sorter option 207 on the basis of a user instruction input from the external unit or an operation panel (not shown) connected to the video controller 202.

The engine controller 203 controls a mechanism associated with the electrophotography process incorporated in the image recording apparatus 201, i.e., charging, exposure, development, transfer, fixing, and paper conveyance, thereby performing image recording based on the received video signal. Simultaneously, the engine controller 203 controls the paper deck option 205 through the paper deck interface 206 on the basis of the instruction from the video controller 202, thereby outputting an instruction for the paper feed timing or the like. In addition, the engine controller 203 also controls the sorter option through the sorter interface 208, thereby outputting an instruction for recording paper sorting or the like.

However, the prior art has the following problem. In the prior art, since the respective optional units are directly connected to the engine controller, the degree of freedom of adding optional units is low. To add more optional units and attain a multi-functional system, the engine controller for connecting and controlling optional units must have high performance.

In recent years, image recording apparatuses have been used in various environments, and demands for the use of optional units with many functions or free combination of various optional units are high. However, to control various optional units in the conventional arrangement, the engine controller must control many objects in addition to the electrophotography process, resulting in an increase in cost of the engine controller. Particularly, this increase in cost is profitless for users who do not need any optional unit at all.

SUMMARY OF THE INVENTION

The present invention has been made in consideration of the above problem, and has as its object to allow to attach/detach a control unit associated with an optional unit to/from an image recording apparatus in which at least one optional unit can be mounted.

According to the present invention, there is provided a first image recording apparatus in which at least one optional unit can be mounted, comprising recording mechanism control means for controlling a recording mechanism for recording an image, detachable option control means for controlling said optional unit and the recording mechanism control means while arbitrating between the optional unit and the recording mechanism control means, and main control means for controlling image recording operation via a first interface for connecting the detachable option control means and a second interface for connecting the recording mechanism control means.

For the first image recording apparatus according to the present invention, preferably, the main control means controls to record an image through the first interface when an optional unit is mounted and to record an image through the second interface when an optional unit is not mounted.

When the optional unit is mounted, preferably, the first image recording apparatus according to the present invention has a first mode in which the recording mechanism control means is controlled by the main control means through the first interface and a second mode in which the recording mechanism control means is controlled by the main control means through the second interface.

When the optional unit is mounted, preferably, the first image recording apparatus according to the present invention has a first mode in which the optional unit is controlled by the main control means through the first interface and a second mode in which the optional unit is directly controlled by the main control means.

For the first image recording apparatus according to the present invention, the optional unit preferably includes a supply unit which contains recording media for recording the image and supplies a predetermined number of recording media to the recording medium.

For the first image recording apparatus according to the present invention, the optional unit preferably includes a sort unit for sorting recording media for recording the image, which are output from the recording mechanism.

For the first image recording apparatus according to the present invention, the recording mechanism preferably records the image on a recording medium with an electrophotography process.

According to the present invention, there is also provided a second image recording apparatus in which at least one optional unit can be mounted, comprising recording mechanism control means for controlling a recording mechanism for recording an image, attachment/detachment means for attaching/detaching an option control unit which controls the optional unit and the recording mechanism control means while arbitrating between the optional unit and the recording mechanism control means, and main control means for controlling image recording operation through a first interface for connecting the detachable option control means and a second interface for connecting the recording mechanism control means.

For the second image recording apparatus according to the present invention, preferably, the main control means controls to record an image through the first interface when an optional unit is mounted and to record an image through the second interface when an optional unit is not mounted.

When the option control unit is mounted, preferably, the second image recording apparatus according to the present invention has a first mode in which the recording mechanism control means is controlled by the main control means through the first interface and a second mode in which the recording mechanism control means is controlled by the main control means through the second interface.

When the optional unit is mounted, preferably, the second image recording apparatus according to the present invention has a first mode in which the optional unit is controlled by the main control means through the first interface and a second mode in which the optional unit is directly controlled by the main control means.

According to the present invention, there is also provided an option control apparatus for controlling an optional unit in an image recording apparatus comprising recording mechanism control means for controlling a recording mechanism for recording an image and main control means for controlling the recording mechanism control means on the basis of a recording instruction, comprising attachment/detachment means for attaching/detaching the image recording apparatus, and relay means for controlling the optional unit and the recording mechanism control means while arbitrating between the optional unit and the recording mechanism control means on the basis of an instruction from the main control means.

Preferably, the option control apparatus according to the present invention has a first mode in which the recording mechanism control means is controlled through the relay means on the basis of the instruction from the main control means, and a second mode in which the instruction from the main control means is directly supplied to the recording mechanism control means so that the recording mechanism control means is directly controlled by the main control means, and further comprises bypass means for supplying the instruction from the main control means to the recording mechanism control means in the second mode while bypassing the relay means.

Preferably, the option control apparatus according to the present invention has a first mode in which the optional unit is controlled through the relay means on the basis of the instruction from the main control means, and a second mode in which the instruction from the main control means is directly supplied to the optional unit so that the optional unit is directly controlled by the main control means, and further comprises bypass means for supplying the instruction from the main control means to the optional unit in the second mode while bypassing the relay means.

According to the present invention, there is also provided a third image recording apparatus for recording an image on the basis of a recording instruction, comprising recording mechanism control means for controlling a recording mechanism for recording the image, at least one detachable optional unit, detachable option control means for controlling the optional unit and the recording mechanism control means while arbitrating between the optional unit and the recording mechanism control means, and main control means for controlling the recording mechanism control means directly or indirectly through the option control means on the basis of the recording instruction to record the image.

For the third image recording apparatus according to the present invention, the main control means preferably directly controls the recording mechanism control means when the optional unit is not mounted and indirectly controls the recording mechanism control means through the option control means when the optional unit is mounted.

When the optional unit is mounted, preferably, the third image recording apparatus according to the present invention has a first mode in which the recording mechanism control means is indirectly controlled by the main control means through the option control means and a second mode in which the recording mechanism control means is directly controlled by the main control means, and further comprises bypass means for directly controlling the recording mechanism control means by the main control means in the second mode while bypassing the option control means.

When the optional unit is mounted, preferably, the third image recording apparatus according to the present invention has a first mode in which the optional unit is indirectly controlled by the main control means through the option control means and a second mode in which the optional unit is directly controlled by the main control means, and further comprises bypass means for directly controlling the optional unit by the main control means in the second mode while bypassing the option control means.

According to the preferred embodiments of the present invention, when an optional unit is mounted, a video controller serving as main control means sends various control commands to a supervising controller serving as option control means through a supervising interface. The supervising controller controls an engine controller serving as recording mechanism control means through an engine interface while controlling the optional unit in accordance with the received control commands, thereby recording an image (indirect control). When no optional unit is mounted, the video controller directly controls the engine controller through a video interface, thereby recording an image. With the above arrangement, the supervising controller can be detached.

Further objects, features and advantages of the present invention will become apparent from the following detailed description of embodiments of the present invention with reference to the accompanying drawings.

DETAILED DESCRIPTION OF THE PREFERRED EMBODIMENTS

[First Embodiment]

Figure 1:
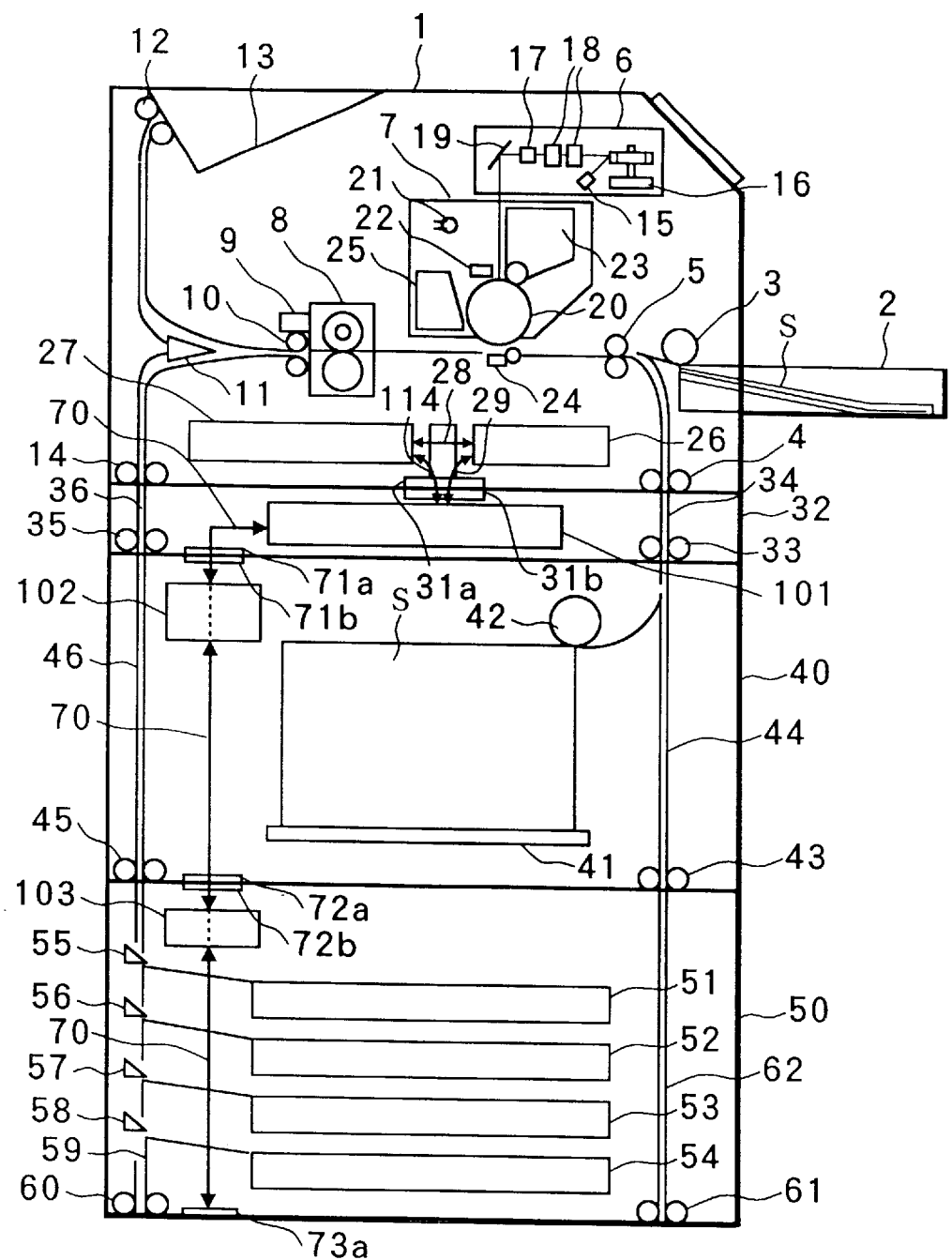
FIG. 1 is a sectional view schematically showing the arrangement of a laser beam printer according to the first embodiment of an image recording apparatus of the present invention.

The first embodiment of the present invention will be described below with reference to the accompanying drawings. FIG. 1 is a sectional view schematically showing the arrangement of a laser beam printer as an embodiment of an image recording apparatus of the present invention. The present invention is not intended for application to only a laser beam printer but can be widely applied to a printer such as an ink-jet printer using another image forming technique. For the descriptive convenience, an arrangement with two optional units connected will be described below. However, many more optional units can be connected, as a matter of course.

<Arrangement of Laser Beam Printer Main Body>

Referring to FIG. 1, reference numeral 1 denotes a laser beam printer main body (to be occasionally referred to as a printer main body hereinafter). Recording paper sheets S contained in a cassette 2 are supplied into the printer main body 1 by a feeding roller 3. Optional feeding rollers 4 supply a recording paper sheet S which is fed from a feeding option (to be described later in detail) into the printer main body 1. A registering roller pair 5 are arranged downstream the feeding roller 3 and the optional feeding rollers 4 to synchronously convey the fed recording paper sheet S. An image recording unit 7 for forming a toner image on the recording paper sheet S with a laser beam emitted from a laser scanner unit 6 is arranged downstream the registering roller pair 5.

A fixing unit 8 is arranged downstream the image recording unit 7 to thermally fix the toner image formed on the recording paper sheet S. A delivery sensor 9, convey rollers 10 for conveying the recording paper sheet S, and a flapper 11 for switching the conveyance direction of the recording paper sheet S subjected to a recording operation are arranged downstream the fixing unit 8. Upon switching the flapper 11, the recording paper sheet S passes between delivery rollers 12 and is stacked on a stack tray 13, or conveyed to optional delivery rollers 14 and conveyed to an optional delivery unit.

The laser scanner unit 6 comprises a laser unit 15 for emitting a laser beam modulated on the basis of an image signal (image signal VDO) sent from a video controller 27 (to be described later), a polygon motor 16 for scanning the laser beam from the laser unit 15 on a photosensitive drum 20, a beam detector 17 for detecting the laser beam position along the scanning direction, an imaging lens group 18, and a deflecting mirror 19. The image recording unit 7 comprises the photosensitive drum 20, a preexposure lamp 21, a primary charger 22, a developer 23, a transfer charger 24, and a cleaner 25, which are necessary for a known electrophotography process.

An engine controller 26 performs control of the electrophotography process performed by the laser scanner 6, the image recording unit 7, and the fixing unit 8, and control of recording paper conveyance in the printer main body 1. The video controller 27 develops image information sent from an external unit (not shown) such as a personal computer connected through a general-purpose interface (e.g., centronics or RS232C) into bit data and sends the bit data as the signal VDO to the engine controller 26, or sends a control instruction such as a print start instruction. If an option supervising unit 32 (to be described later) is connected, the video controller 27 indirectly communicates with the engine controller 26 through the option supervising unit 32.

A video interface 28 enables communication between the video controller 27 and the engine controller 26 when no optional unit is mounted.

The arrangement of an option supervising unit and optional units, which can be attached/detached to/from the printer main body 1, will be described below.

<Arrangement of Option Supervising Unit>

The option supervising unit 32 has a supervising controller 101 for supervising and controlling various optional units. When an option is mounted, the supervising controller 101 is connected to the video controller 27 through a supervising interface 114 connected with connectors 31a and 31b. The supervising controller 101 is also connected to the engine controller 26 through an engine interface 29. When the supervising controller 101 is connected through the connectors 31a and 31b, the interface 28 between the video controller 27 and the engine controller 26 is disabled by electrical disconnection of the signal line, or logical disconnection by control from the supervising controller 101 while the supervising interface 114 is enabled. The engine interface 29 between the supervising controller 101 and the engine controller 26 can be an interface having the same function as that of the video interface 28.

The option supervising unit 32 has feeding relay conveyance rollers 33 and a feeding relay conveyance path 34, which relay recording paper conveyance from a feeding system optional unit, and delivery relay conveyance rollers 35 and a delivery relay conveyance path 36, which relay recording paper conveyance to a delivery system optional unit.

<Arrangement of Optional Unit>

A large-capacity paper deck optional unit 40 for containing recording paper sheets S has a paper deck 41 which moves in the vertical direction, and feeds recording paper sheets S stacked on the paper deck 41 by using a paper deck feeding roller group 42, as needed. The paper deck optional unit 40 has feeding relay conveyance rollers 43 and a feeding relay conveyance path 44, which relay recording paper conveyance from another feeding system optional unit (not shown), and delivery relay conveyance rollers 45 and a delivery relay conveyance path 46, which relay recording paper conveyance to a delivery system option. The paper deck optional unit 40 is controlled by a paper deck controller 102.

A sorter optional unit 50 has a plurality of delivery bins, i.e., a first bin 51, a second bin 52, a third bin 53, and a fourth bin 54 to sort recording paper sheets S that have undergone recording operations and stacks the recording paper sheets S. Sorting of recording paper sheets S into the respective bins is performed using a first flapper 55, a second flapper 56, a third flapper 57, and a fourth flapper 58. The sorter optional unit 50 also has feeding relay conveyance rollers 61 and a feeding relay conveyance path 62, which relay recording paper conveyance from a feeding system optional unit (not shown), and delivery relay conveyance rollers 60 and a delivery relay conveyance path 59, which relay recording paper conveyance to another delivery system optional unit (not shown). The sorter optional unit 50 is controlled by a sorter controller 103.

The supervising controller 101, the paper deck controller 102, and the sorter controller 103 are coupled to each other through connectors 71a and 71b and connectors 72a and 72b, respectively, and electrically connected to each other through an optional unit interface 70. The connectors 71a, 72a, and 73a are connectors of the same type. The connectors 71b and 72b are also connectors of the same type. Therefore, the paper deck optional unit 40 and the sorter optional unit 50 can be connected while reversing their order in the vertical direction.

<Examples of Electrical Connection of Controllers>

Figure 2:
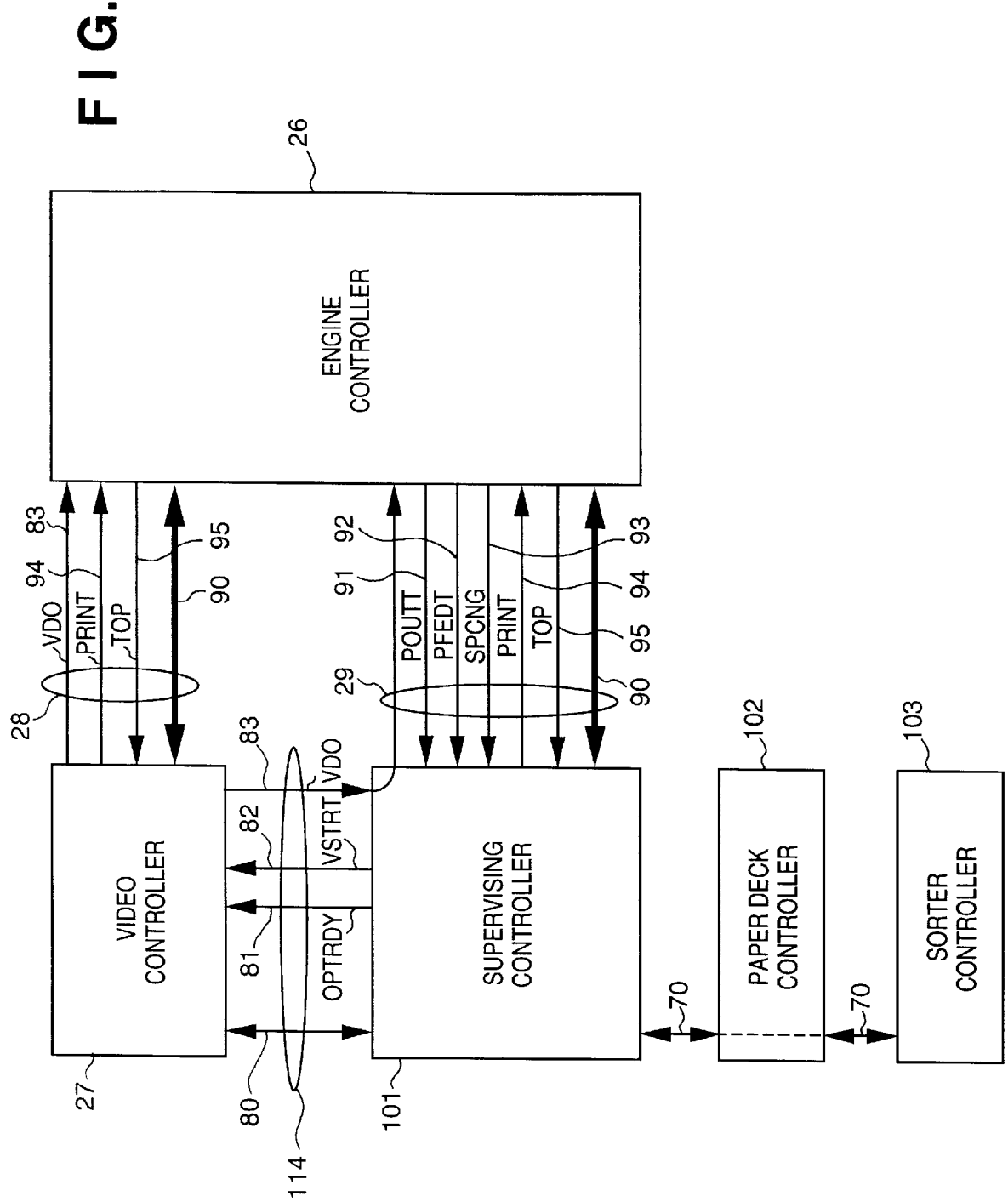
FIG. 2 is a block diagram showing an example of electrical connection of controllers in the first embodiment.

Electrical connection of the respective controllers will be described below. FIG. 2 is a block diagram showing an example of electrical connection of the respective controllers. When no optional unit is mounted, the video controller 27 is connected to the engine controller 26 via the video interface 28. The video interface 28 is composed of a serial communication interface 90, a VDO signal line 83, a PRINT signal line 94, a TOP signal line 95, and other hard signal lines (not shown). Note, a signal on each signal line is referred by the same reference numeral that denotes the signal line, hereinafter. For example, respective signals on the VDO signal line 83, the PRINT signal line 94 and the TOP signal line 95 are also referred as the VDO signal 83, the PRINT signal 94 and the TOP signal 95. A VDO signal 83 represents image information in a form of bit data, a PRINT signal 94 is for triggering a print operation by the engine controller 27, and a TOP signal 95 is a timing signal for triggering transmission of the VDO signal 83 from the engine controller 26. When optional units are mounted, the video controller 27 is connected to the supervising controller 101 via the supervising interface 114. The supervising interface 114 is constituted by a serial communication interface line 80 and three hard signal lines, i.e., an OPTRDY signal line 81, a VSTRT signal line 82, and a VDO signal line 83.

The video controller 27 transmits a command for designating paper feed by the paper deck optional unit 40, a command for designating a delivery bin of the sorter optional unit 50, a command for designating the operation of the printer main body 1 (e.g., a printer engine), or a command for inquiring the status of the printer main body 1 to the supervising controller 101 through the serial communication interface 80. The supervising controller 101 inspects a status representing the presence/absence of recording paper sheets in the paper deck optional unit 40 or the stack state of each delivery bin of the sorter optional unit 50, or the status of the printer main body 1, and sends it back to the video controller 27. The supervising controller 101 and the video controller 27 may be directly connected through a CPU bus.

The OPTRDY signal 81 is a signal representing whether the optional unit designated by the video controller 27, and the printer main body 1 are in a usable state. The VSTRT signal 82 is a timing signal for making the video controller 27 transmit the VDO signal 83. The VDO signal 83 bypasses the supervising controller 101 and is input to the engine controller 26.

The engine interface 29 is constituted by a serial communication interface 90, a POUTT signal line 91, a PFEDT signal line 92, an SPCNG signal line 93, the PRINT signal line 94, the TOP signal line 95, the VDO signal line 83 included in the supervising interface 114 which is connected while bypassing the supervising interface 114, and other hard signals (not shown).

On the basis of an instruction from the video controller 27, the supervising controller 101 transmits a command for designating paper feed in the printer main body 1 or inquiring the status of the printer main body 1 through the serial communication interface 90. Upon receiving the command, the engine controller 26 transmits the status of the printer main body 1 to the supervising controller 101 through the serial communication interface 90.

The POUTT signal 91 is a timing signal representing the timing of delivery of a recording paper sheet from the printer main body 1. The PFEDT signal 92 is a timing signal representing the timing at which the printer main body 1 can receive a recording paper sheet from the optional unit. The SPCNG signal 93 is a signal for designating to decelerate a recording paper sheet S which has been conveyed through the optional unit at a high speed and match its speed with the conveyance speed in the printer main body 1. A VDO signal line 83 of the supervising interface 114, and a PRINT signal line 94 and a TOP signal line 95 of the engine interface 29 are used for the same purposes of the VDO signal line 83, the PRINT signal line 94 and the TOP signal line 95 of the video interface 28, respectively.

The video controller 27 recognizes the mount/non-mount state of the supervising controller 101, and automatically switches the interfaces 114 and 28 to be used in the mount/non-mount state of the supervising controller 101. As for the presence/absence of the supervising controller 101, for example, a predetermined confirmation signal is supplied to the interface 114 upon turning on the power supply. The presence/absence of a response to the confirmation signal is determined (upon receiving the confirmation signal, the supervising controller 101 responds to the confirmation signal). If a response is detected, it is recognized that the supervising controller 101 is connected. Alternatively, a change-over switch (not shown) can be arranged, and the interfaces 114 and 28 can be switched by the switch.

Figure 6:
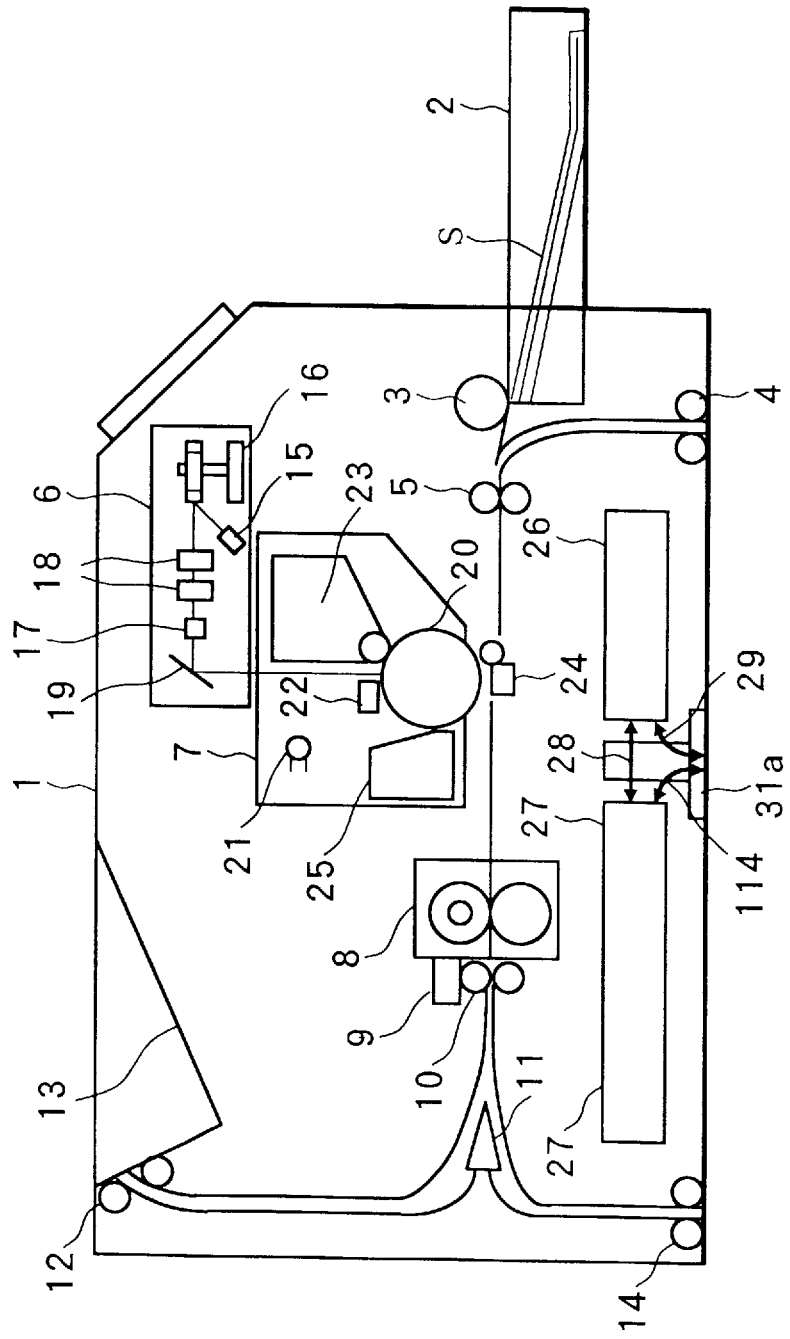
FIG. 6 is a sectional view schematically showing the arrangement of a laser beam printer in which no optional unit is mounted.
Figure 7:
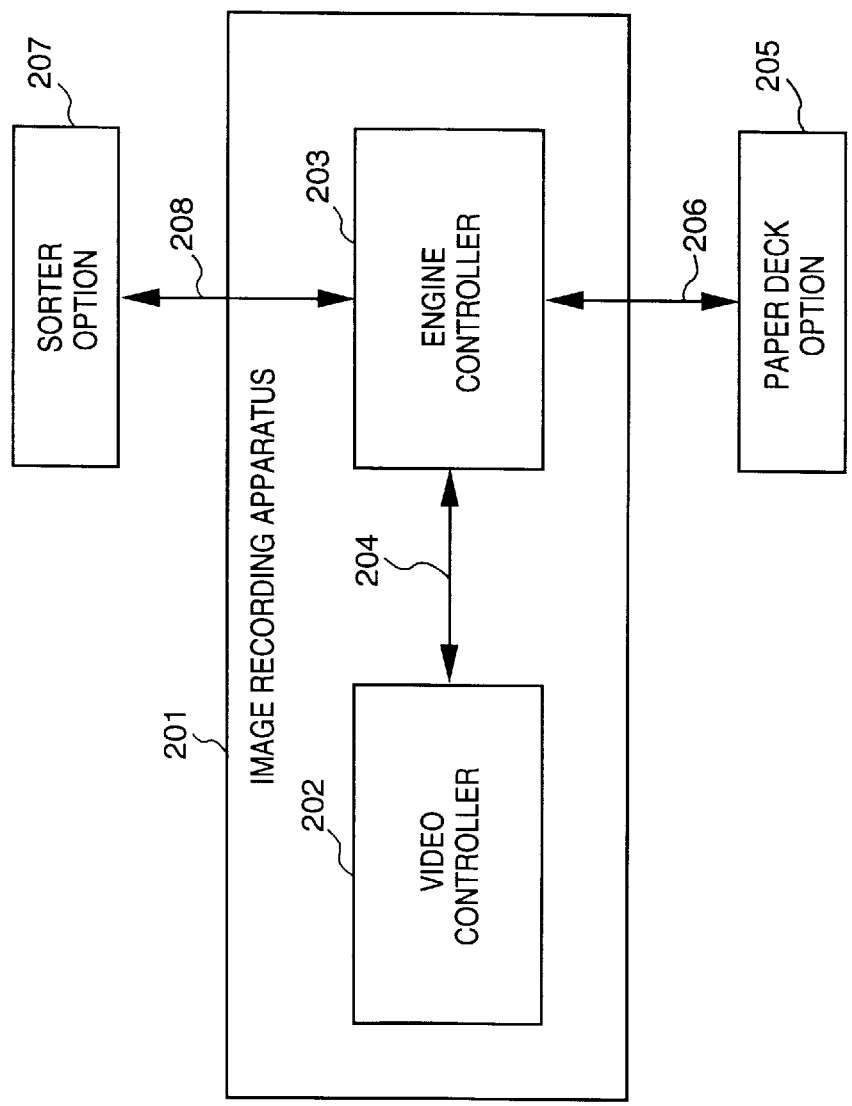
FIG. 7 is a block diagram showing the arrangement of a conventional image recording apparatus.

When no optional unit is mounted as shown in FIG. 6, upon receiving image information and a print instruction from an external device (not shown), such as a personal computer, the video controller 27 changes the image information to bit data. Then, the video controller 27 instructs the engine controller 26 to start print operation via the PRINT signal line 94 of the video interface 28. Upon receiving the PRINT signal 94, the engine controller 26 starts feeding a recording paper sheet S. Thereafter, when the recording paper sheet S reaches a predetermined position, the engine controller 26 sends out the TOP signal 95. The video controller 27 sends bit data via the VDO signal line 83 trigged by the TOP signal 96 sent from the engine controller 26. The engine controller 26 controls each unit associated with electronic photographing process, thereby an image is recorded on the recording paper sheet S on the basis of the VDO signal 83.

When optional units are mounted, as shown in FIG. 1, upon receiving image information and a print instruction from an external unit (not shown), such as a personal computer, the video controller 27 changes the image information to bit data as well as transmits commands for, e.g., designating a paper feed opening, a paper discharge opening and a delivery bin to the supervising controller 101 via the supervising interface 114. The video controller 27 also informs the supervising controller 101 that the bit data is ready for output, and waits for a VSTRT signal 82 which is for triggering print operation. When the VSTRT signal 82 is transmitted, the video controller 27 transmits the bit data via the VDO signal line 83 trigged by the VSTRT signal 82. Note, the video controller 27 does not have to control and supervise operational states of each operational unit, the printer main body 1 and the engine controller 26 individually, but to supervise the OPTRDY signal line 81.

The supervising controller 101 issues predetermined instructions to the paper deck controller 102 and the sorter controller 103 via the operational unit interface 70 in accordance with the command received from the video controller 27 via the supervising interface 114, as well as issues an instruction to the engine controller 26 via the engine interface 29. Further, the supervising controller 101 supervises states of each optional unit, the printer main body 1 and the engine controller 26. If any of these units is in an unusable state, the supervising controller 101 informs the video controller 27 of the unusable unit via an OPTRDY signal line of the supervising interface 114.

Further, in a print operation in practice, the supervising controller 101 instructs the paper deck optional unit 40 so as to match a conveyance speed of the recording paper sheet S in the paper deck optional unit 40 to a conveyance speed in the printer main body 1 in accordance with the SPCNG signal 93 of the engine interface 29. Next, the supervising controller 101 checks whether the printer main body 1 is ready for receiving a recording paper sheet from an optional unit on the basis of the PFEDT signal 92 of the engine interface 29, and timing to feed a recording paper sheet from the paper deck optional unit 40 is controlled. Further, the supervising controller 101 checks timing of discharging the recording paper sheet from the printer main body 1 in accordance with the POUTT signal 91 of the engine interface 29 and timing of operation of the sorter optional unit 50 is controlled. As described above, by sending the PRINT signal 94 of the engine interface 29 while controlling timing of feeding a recording paper sheet from the paper deck optional unit 40, timing of discharging the recording paper sheet to the sorter optional unit 50 and timing of operation of the printer main body 1 in consideration with timing of each other, the engine controller 26 is instructed to start print operation. Upon receiving the PRINT signal 94, the engine controller 26 starts feeding a recording paper sheet, then, when the recording paper sheet S reaches a predetermined position, it sends the TOP signal 95. The supervising controller 101 outputs the VSTRT signal 82 via the supervising interface 114 in response to the TOP signal 95 sent from the engine controller 26. Since the VDO signal 83 by-passes in the supervising controller 101, the bit data is directly transmitted from the video controller 27 to the engine controller 26.

The engine controller 26 controls each mechanism associated with electronic photographing process and records an image on a recording paper sheet on the basis of the VDO signal 83, as well as sends an SPCNG signal 93, a POUTT signal 91 and a PFEDT signal 92 via the engine interface 29 at predetermined timing.

As described above, according to the first embodiment, various optional units can be connected as needed without increasing the cost of the image recording apparatus main body.

Since recording paper conveyance and image recording are supervised and controlled by a control unit such as the supervising controller for optional units, the image recording apparatus main body can be released from control of recording paper conveyance in optional units. In addition, control instructions output from the main control unit such as the video controller of the image recording apparatus main body an be simplified. Furthermore, only by changing the supervising controller, a newly developed optional unit an be mounted.

[Second Embodiment]

An image recording apparatus according to the second embodiment of the present invention will be described below. The same reference numerals as in the first embodiment denote the same constituent elements in the second embodiment, and a detailed description thereof will be omitted.

Figure 3:
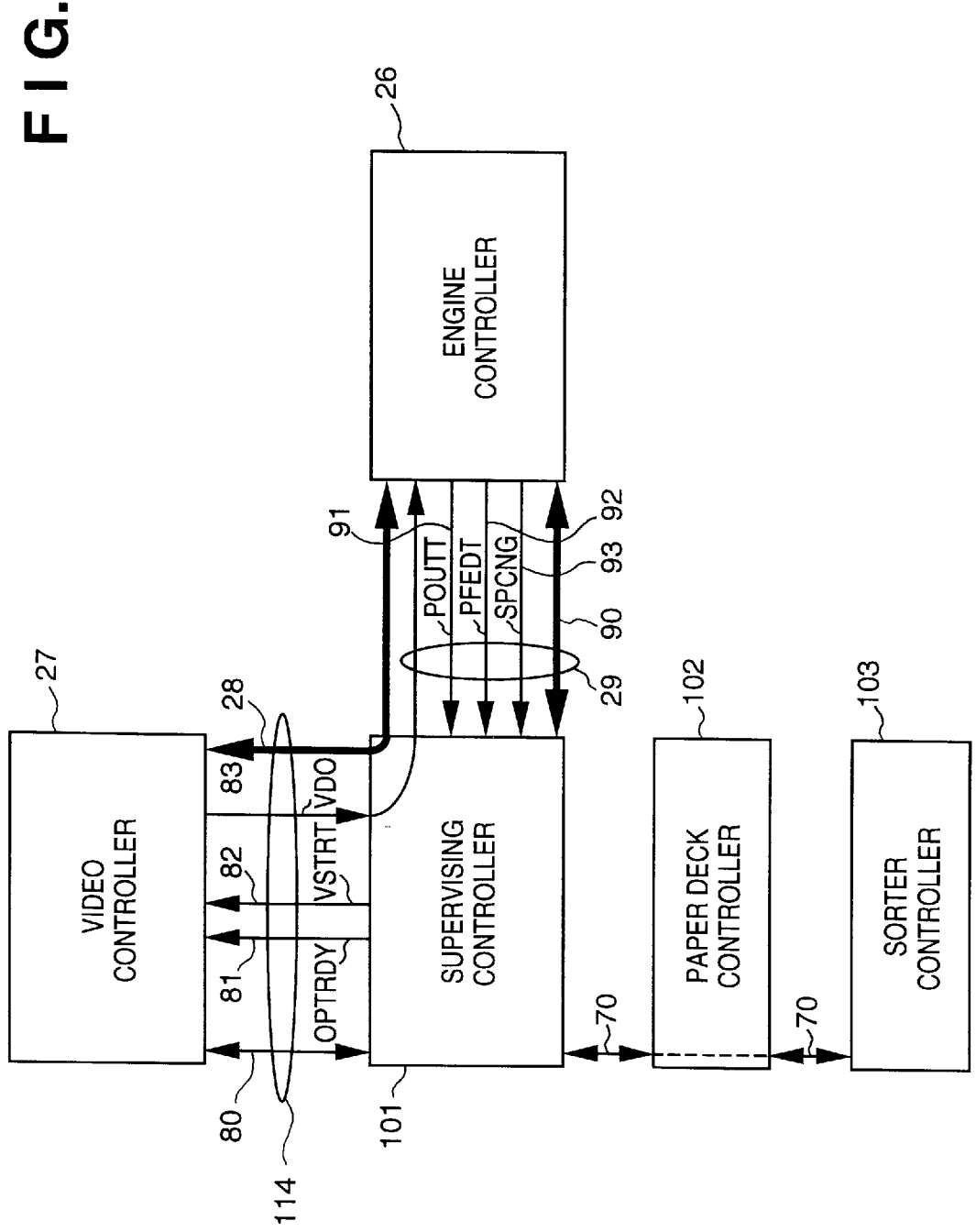
FIG. 3 is a block diagram showing an example of electrical connection of controllers in the second embodiment.

FIG. 3 is a block diagram showing the connection state of controllers in this embodiment. The second embodiment is different from the first embodiment in that a video controller 27 and an engine controller 26 are directly connected through a video interface 28 while bypassing a supervising controller 101.

The supervising controller 101 has a first operation mode (a mode for disabling the video interface 28) in which the supervising controller 101 is operated upon receiving an instruction from the video controller 27 through a supervising interface 114, and a second operation mode (a mode for enabling the video interface 28) in which the supervising controller 101 leaves handling of control instructions associated with the engine controller 26 to the video controller 27. In the first operation mode, the same control as that performed in the first embodiment when an option is mounted is performed. In the second operation mode, the video controller 27 controls the engine controller 26 through the video interface 28 independently of the presence/absence of an optional unit. In the second mode, the optional unit is controlled through an optional unit interface 70 on the basis of an instruction sent from the video controller 27 through an interface line 80.

These operation modes may be switched in accordance with an instruction from the video controller 27, by operating a switch or the like, or by another method. Unless otherwise specified, the supervising controller 101 operates in the second operation mode.

In the above description, the video interface 28 bypasses the supervising controller 101. However, the video controller 27 and the engine controller 26 may be connected without bypassing the supervising controller 101.

According to the second embodiment, the same effect as in the first embodiment can be obtained. In addition, in the second mode, the video controller 27 can directly control the engine controller 26 independently of the presence/absence of an optional unit, so that limitation as to the arrangement of the video controller 27 can be minimized. More specifically, even in a printer with a video controller incompatible to the supervising interface 114, an optional unit can be mounted and used.

[Third Embodiment]

An image recording apparatus according to the third embodiment of the present invention will be described below. The same reference numerals as in the first embodiment denote the same constituent elements in the third embodiment, and a detailed description thereof will be omitted.

Figure 4:
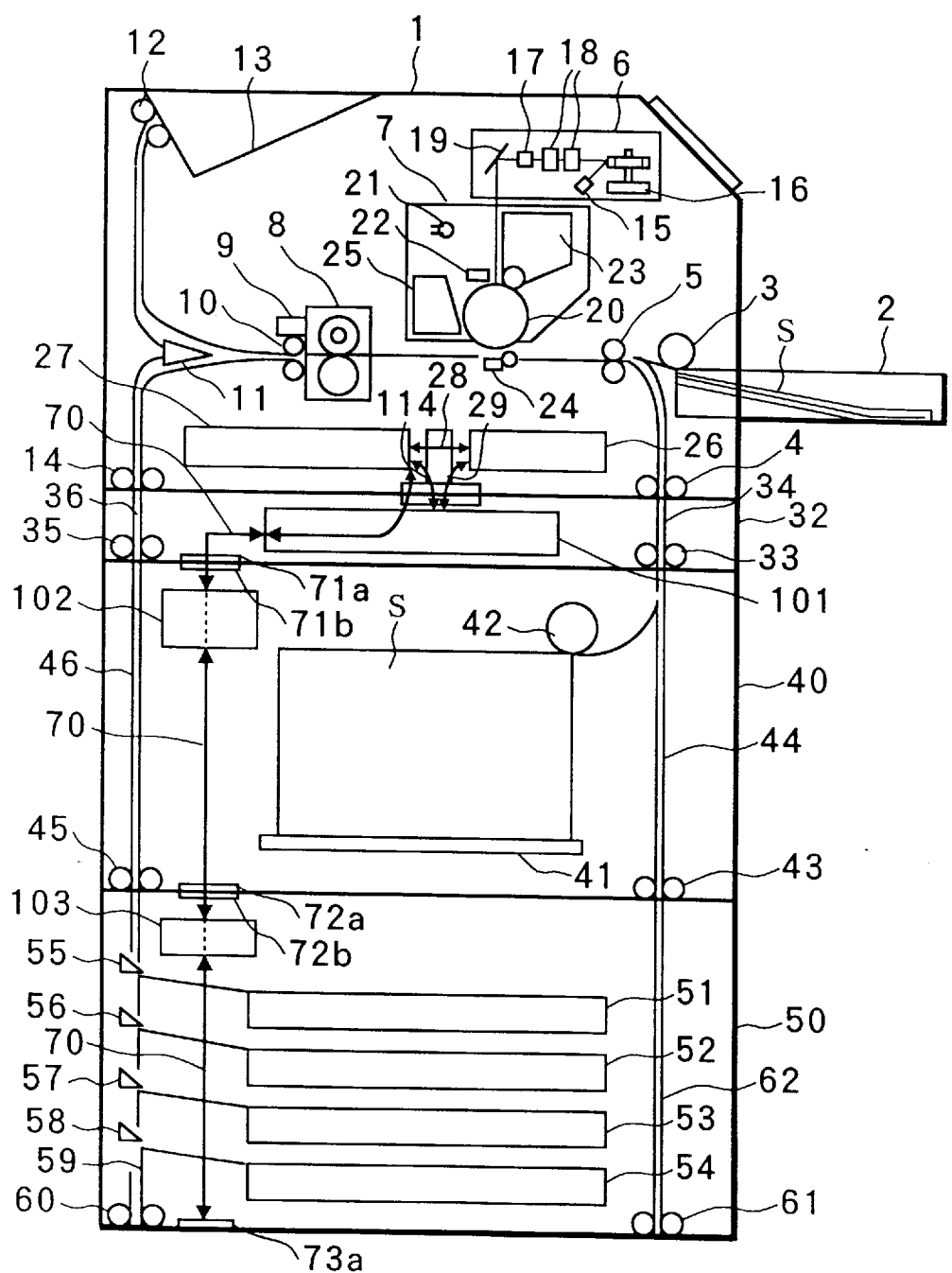
FIG. 4 is a sectional view showing an arrangement of a laser beam printer according to the third embodiment.
Figure 5:
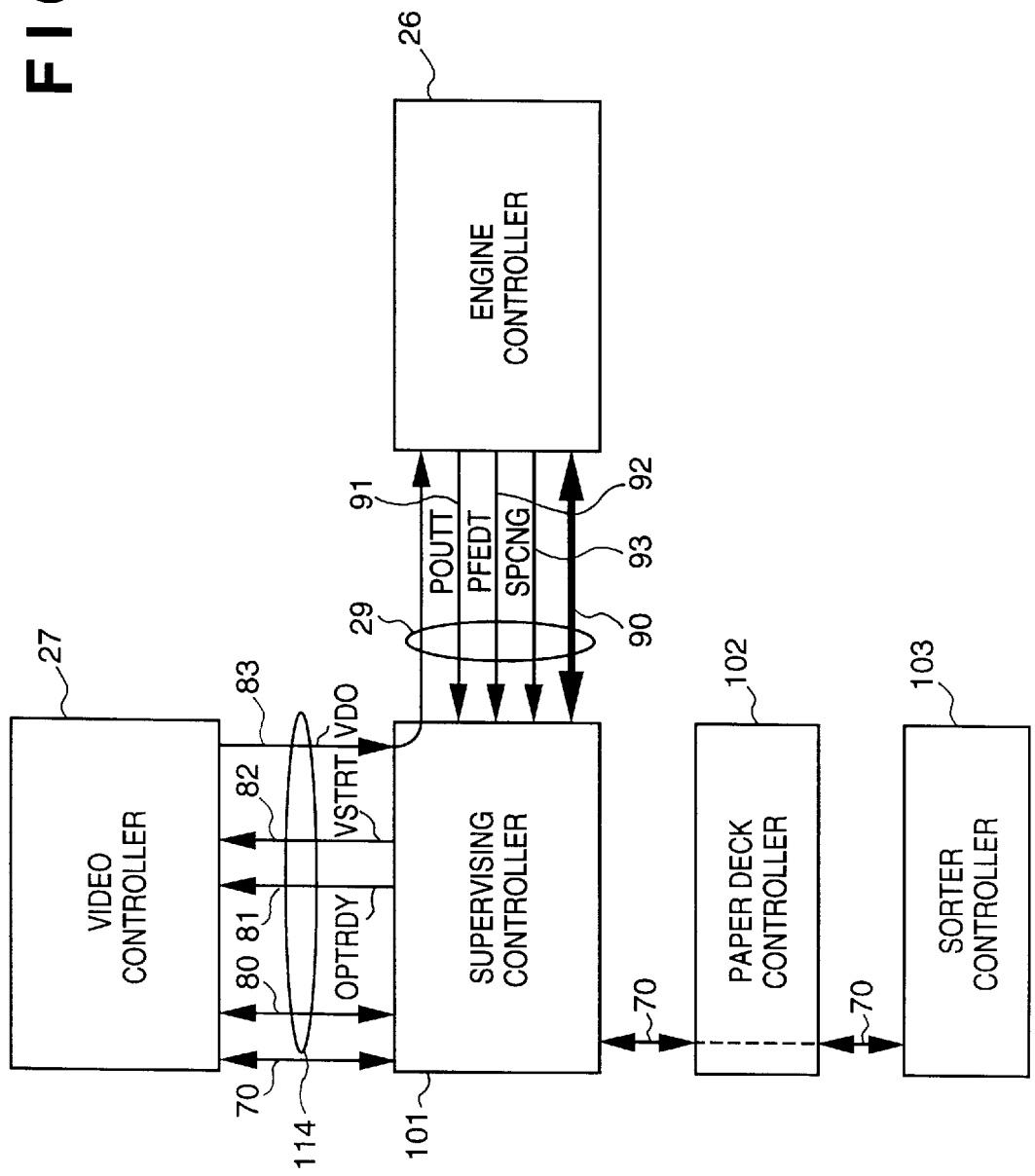
FIG. 5 is a block diagram showing an example of electrical connection of controllers in the third embodiment.

FIG. 4 is a sectional view showing the arrangement of a laser beam printer according to the third embodiment. FIG. 5 is a block diagram showing an example of connection of controllers in the third embodiment. The third embodiment is different from the first embodiment in that an optional unit interface 70 is directly connected to a video controller 27 while bypassing a supervising controller 101.

The supervising controller 101 has a first operation mode in which the supervising controller 101 controls an optional unit upon receiving an instruction from the video controller 27 through a supervising interface 114, and a third operation mode in which the supervising controller 101 leaves handling of control instructions associated with the optional unit to the video controller 27.

In the first operation mode, the same control as that performed in the first embodiment when an optional unit is mounted is performed. In the third operation mode, the video controller 27 can directly control an optional unit such as a paper deck optional unit 40 or a sorter optional unit 50 through the optional unit interface 70. These operation modes may be switched in accordance with an instruction from the video controller 27, by operating a switch or the like, or by another method.

According to the third embodiment, the same effect as in the first embodiment is obtained. In addition, when an optional unit incompatible to the supervising controller 101 is to be mounted, and the video controller 27 has a function compatible to the optional unit, the optional unit can be mounted. For an optional unit which is likely to be mounted with a high probability, a function for controlling the optional unit can be effectively incorporated in the video controller 27.

In the third embodiment, the optional unit interface 70 is connected to the video controller 27 while bypassing the supervising controller 101.

However, the video controller 27 may be connected to an optional unit such as a paper deck controller 102 or a sorter controller 103 without bypassing the supervising controller 101.

In addition to the first and third operation modes of the third embodiment, the second operation mode of the second embodiment may also be combined.

The present invention can be applied to a system constituted by a plurality of devices such as a host computer, an interface, an image scanner, and a printer, or to an apparatus comprising a stand-alone device such as a copy machine. Furthermore, it goes without saying that the invention is applicable also to a case where the invention is implemented by supplying a program to a system or apparatus. In this case, a memory medium which stores a program associated with the present invention constitutes the present invention. When the program is read out from the memory medium to a system or apparatus, the system or apparatus operates in a predetermined manner.

As has been described above, according to the present invention, when an optional unit is unnecessary, an option control means for controlling the optional unit can be detached, so that the cost of the apparatus can be reduced.

The main control means can be released from specific control associated with the optional unit, so that the control mechanism can be simplified.

When the option control means is changed, a new optional unit can be easily developed and added.

The present invention is not limited to the above embodiments and various changes and modifications can be made within the spirit and scope of the present invention. Therefore, to apprise the public of the scope of the present invention, the following claims are made.

What is claimed is:

1. An image recording apparatus in which at least one optional unit can be mounted, comprising:
   recording mechanism control means for controlling a recording mechanism for recording an image;
   detachable option control means for controlling said optional unit and said recording mechanism control means while arbitrating between said optional unit and said recording mechanism control means; and
   main control means for controlling image recording operation through a first interface for connecting said detachable option control means and a second interface for connecting said recording mechanism control means.

2. The apparatus according to claim 1, wherein said main control means controls to record an image through said first interface when an optional unit is mounted and to record an image through said second interface when an optional unit is not mounted.

3. The apparatus according to claim 1, wherein, when said optional unit is mounted, said apparatus has a first mode in which said recording mechanism control means is controlled by said main control means through said first interface and a second mode in which said recording mechanism control means is controlled by said main control means through said second interface.

4. The apparatus according to claim 1, wherein, when said optional unit is mounted, said apparatus has a first mode in which said optional unit is controlled by said main control means through said first interface and a second mode in which said optional unit is directly controlled by said main control means.

5. The apparatus according to claim 1, wherein said optional unit includes a supply unit which contains recording media for recording the image and supplies a predetermined number of recording media to said recording medium.

6. The apparatus according to claim 1, wherein said optional unit includes a sort unit for sorting recording media for recording the image, which are output from said recording mechanism.

7. The apparatus according to claim 1, wherein said recording mechanism records the image on a recording medium with an electrophotography process.

8. An image recording apparatus in which at least one optional unit can be mounted, comprising:
   recording mechanism control means for controlling a recording mechanism for recording an image;
   attachment/detachment means for attaching/detaching an option control unit which controls said optional unit and said recording mechanism control means while arbitrating between said optional unit and said recording mechanism control means; and
   main control means for controlling image recording operation through a first interface for connecting said detachable option control means and a second interface for connecting said recording mechanism control means.

9. The apparatus according to claim 8, wherein said main control means controls to record an image through said first interface when an optional unit is mounted and to record an image through said second interface when an optional unit is not mounted.

10. The apparatus according to claim 8, wherein, when said optional unit is mounted, said apparatus has a first mode in which said recording mechanism control means is controlled by said main control means through said first interface and a second mode in which said recording mechanism control means is controlled by said main control means through said second interface.

11. The apparatus according to claim 8, wherein, when said optional unit is mounted, said apparatus has a first mode in which said optional unit is controlled by said main control means through said first interface and a second mode in which said optional unit is directly controlled by said main control means.

12. The apparatus according to claim 8, wherein said optional unit includes a supply unit which contains recording media for recording the image and supplies a predetermined number of recording media to said recording medium.

13. The apparatus according to claim 8, wherein said optional unit includes a sort unit for sorting recording media for recording the image, which are output from said recording mechanism.

14. The apparatus according to claim 8, wherein said recording mechanism records the image on a recording medium with an electrophotography process.

15. An option control apparatus for controlling an optional unit in an image recording apparatus comprising recording mechanism control means for controlling a recording mechanism for recording an image and main control means for controlling said recording mechanism control means on the basis of a recording instruction, comprising:

attachment/detachment means for attaching/detaching said image recording apparatus; and supervising control for controlling said optional unit and said recording mechanism control means while arbitrating between said optional unit and said recording mechanism control means on the basis of an instruction from said main control means.

16. The apparatus according to claim 15, wherein said apparatus has a first mode in which said recording mechanism control means is controlled through said relay means on the basis of the instruction from said main control means, and a second mode in which the instruction from said main control means is directly supplied to said recording mechanism control means so that said recording mechanism control means is directly controlled by said main control means, and further comprises bypass means for supplying the instruction from said main control means to said recording mechanism control means in the second mode while bypassing said supervising control means.

17. The apparatus according to claim 15, wherein said apparatus has a first mode in which said optional unit is controlled through said supervising control means on the basis of the instruction from said main control means, is and a second mode in which the instruction from said main control means is directly supplied to said optional unit so that said optional unit is directly controlled by said main control means, and further comprises bypass means for supplying the instruction from said main control means to said optional unit in the second mode while bypassing said supervising control means.

18. The apparatus according to claim 15, wherein said optional unit includes a supply unit which contains recording media for recording the image and supplies a predetermined number of recording media to said recording medium.

19. The apparatus according to claim 15, wherein said optional unit includes a sort unit for sorting recording media for recording the image, which are output from said recording mechanism.

20. The apparatus according to claim 15, wherein said recording mechanism records the image on a recording medium with an electrophotography process.

21. An image recording apparatus for recording an image on the basis of a recording instruction, comprising:

recording mechanism control means for controlling a recording mechanism for recording the image;

at least one detachable optional unit;

detachable option control means for controlling said optional unit and said recording mechanism control means while arbitrating between said optional unit and said recording mechanism control means; and main control means for controlling said recording mechanism control means directly or indirectly through said option control means on the basis of the recording instruction to record the image.

22. The apparatus according to claim 21, wherein said main control means directly controls said recording mechanism control means when said optional unit is not mounted and indirectly controls said recording mechanism control means through said option control means when said optional unit is mounted.

23. The apparatus according to claim 21, wherein, when said optional unit is mounted, said apparatus has a first mode in which said recording mechanism control means is indirectly controlled by said main control means through said option control means and a second mode in which said recording mechanism control means is directly controlled by said main control means, and further comprises bypass means for directly controlling said recording mechanism control means by said main control means in the second mode while bypassing said option control means.

24. The apparatus according to claim 21, wherein, when said optional unit is mounted, said apparatus has a first mode in which said optional unit is indirectly controlled by said main control means through said option control means and a second mode in which said optional unit is directly controlled by said main control means, and further comprises bypass means for directly controlling said optional unit by said main control means in the second mode while bypassing said option control means.

25. The apparatus according to claim 21, wherein said optional unit includes a supply unit which contains recording media for recording the image and supplies a predetermined number of recording media to said recording medium.

26. The apparatus according to claim 21, wherein said optional unit includes a sort unit for sorting recording media for recording the image, which are output from said recording mechanism.

27. The apparatus according to claim 21, wherein said recording mechanism records the image on a recording medium with an electrophotography process.

* * * * *

UNITED STATES PATENT AND TRADEMARK OFFICE
CERTIFICATE OF CORRECTION

PATENT NO.  : 5,774,764
DATED       : June 30, 1998
INVENTOR(S) : Toyokura et al.

It is certified that error appears in the above-identified patent and that said Letters Patent is hereby corrected as shown below:

COLUMN 5:

Line 32, "are" should read --is--.

COLUMN 8:

Line 44, "trigged" should read --triggered--; and
    Line 61, "trigged" should read --triggered--.

COLUMN 9:

Line 37, "in" should be deleted; and
    Line 58, "an" should read --can--.

COLUMN 13:

Line 10, "control" should read --control means--; and
    Line 31, "is" should be deleted.

Signed and Sealed this

Eleventh Day of May, 1999

*Attest:*

Q. TODD DICKINSON

*Attesting Officer*      *Acting Commissioner of Patents and Trademarks*